United States Patent [19]

Derry et al.

[11] Patent Number: 4,847,855
[45] Date of Patent: Jul. 11, 1989

[54] THERMALLY NEUTRAL DITHER MOTOR DESIGN

[75] Inventors: Robert W. Derry, Stacy; Richard L. Langton, Shoreview, both of Minn.

[73] Assignee: Honeywell Inc., Minneapolis, Minn.

[21] Appl. No.: 176,070

[22] Filed: Mar. 31, 1988

[51] Int. Cl.⁴ .............................................. H01S 3/083
[52] U.S. Cl. ........................................ 372/94; 356/350
[58] Field of Search ...................... 372/18, 94; 356/350

[56] References Cited

U.S. PATENT DOCUMENTS

| | | | |
|---|---|---|---|
| 4,115,004 | 9/1978 | Hutchings et al. | 356/350 |
| 4,309,107 | 1/1982 | McNair et al. | 356/350 |
| 4,314,174 | 2/1982 | Wing et al. | 372/18 |
| 4,321,557 | 3/1982 | McNair | 356/350 |
| 4,349,183 | 9/1982 | Wirt et al. | 356/350 |
| 4,436,423 | 3/1984 | Kumar et al. | 356/350 |
| 4,702,602 | 10/1987 | Grant | 356/350 |
| 4,711,575 | 12/1987 | Butler | 356/350 |
| 4,733,966 | 3/1988 | Butler | 356/350 |
| 4,751,718 | 6/1988 | Hanse et al. | 356/350 |
| 4,779,985 | 10/1988 | Wirt et al. | 350/356 |

Primary Examiner—Léon Scott, Jr.
Attorney, Agent, or Firm—Robert A. Pajak

[57] ABSTRACT

A thermally neutralized ring laser gyro with a dither spring mounted into a central bore of a gyro block which permits dither of the block about an axis of the spring with thermal expansion effects being minimized. The dither spring has a central mounting member, a tubular outer ring member with outer surface segments secured to the block bore, radial members adjoined to and extending outward from the central member to the ring member, generally T-shaped junctions in the ring member and between adjacent ones of the outer surface segments with the radial members being adjoined to the inside of the junctions and an outer surface of each junction being spaced inwardly toward the axis from a major outer diameter defined by the segments and being in non-contact with the block bore. A method of obtaining improved thermal neutrality in a dither gyro includes the steps of leaving a void between each junction and the block bore, and then the further step of expanding the junctions into the voids when the gyro temperature changes.

27 Claims, 1 Drawing Sheet

THERMALLY NEUTRAL DITHER MOTOR DESIGN

BACKGROUND OF THE INVENTION

1. Field of the Invention

This invention pertains to a ring laser gyro with a dither spring within a laser block. Particularly, this invention pertains to a dither spring structure and method of suspending a laser block which minimizes thermally induced stress effects on the laser block.

2. The Prior Art

The need for dither of a ring laser gyro is well known and the prior art provides a variety of gyro block suspension structures enabling dither of the block about a generally centrally located axis within a laser path in the block. The prior art dithered ring laser gyros are sensitive to temperature change because of different rates of thermal expansion of the gyro block and the dither spring fastened to the block. Differences in thermal expansion of the spring and the block impart stress onto the block and degrade the accuracy of output from the gyro.

Attempts have been made to solve the problem of different rates of thermal expansion of the dither spring and the block.

One attempt was an exotic alloy dither spring that was economically not viable.

An effort has been made to isolate the effects of different thermal expansion of a mounting platform and the gyro block by interposing a viscous fluid frictional coupling in the gyro suspension. The fluid coupling allows different radial expansion between parallel and generally plate shaped block and dither drive components of the gyro. This effort is documented in U.S. Pat. No. 4,321,557, issued to McNair.

A more relevant example of the prior art efforts at solving the problem is the provision of a gyro block having a central bore and dither spring having a plurality of discrete arcuate segments fastened in a predetermined angular position to the bore within the block. Each individual discrete arcuate segment is suspended by a pair of radial webs which extend radially outward from a central mounting structure, like opposite sides of a piece of pie, to adjoin to the arcuate segment. Each web has a knee type central portion of relatively thin section that probably enables flexure of the web in an attempt to maintain something approximating a constant length during thermal changes. The arcuate segments are discrete and individual from each other and may easily have different natural frequencies from each other which can impart spurious hoop as well as radial stress onto the gyro block during dither. The geometry of this arcuately segmented dither spring is relatively complicated and requires the provision and usage of guide holes for EDM electrodes during fabrication of the spring. From visual examination, it looks like this particular device emphasizes "more evenly distributed forces" directed from an expanding hinge to the gyroscope body. This "evenly distributed force" is attained by a plurality of mounting segments that correspond in number to the quantity of apexes in the gyro body block and selectively arranging contact and location between the hinge segments and the body bore.

It is, therefore, among the objects of the present invention to provide a ring laser gyro with thermal neutrality, a ring laser gyro having an improved gyro dither spring for providing thermal neutrality to a ring laser gyro, and a method of suspending a laser ring gyro body providing improved thermal neutrality. It is the object of the invention to provide a dither spring in which thermally induced dimensional changes in the dither spring are absorbed which thereby minimizes stress on a laser block. These objects are achieved by provision and use of a dither spring having an outer ring member with outer surface segments having mounting surfaces securable to a gyro block bore and generally T-shaped junctions in between the outer surface segments and spaced inward from the major diameter and in non-contact with the gyro block bore, and with radial members extending inwardly from each junction to a central mounting structure for mounting the dither spring to a support.

DESCRIPTION OF THE PREFERRED EMBODIMENT

Figure 1:
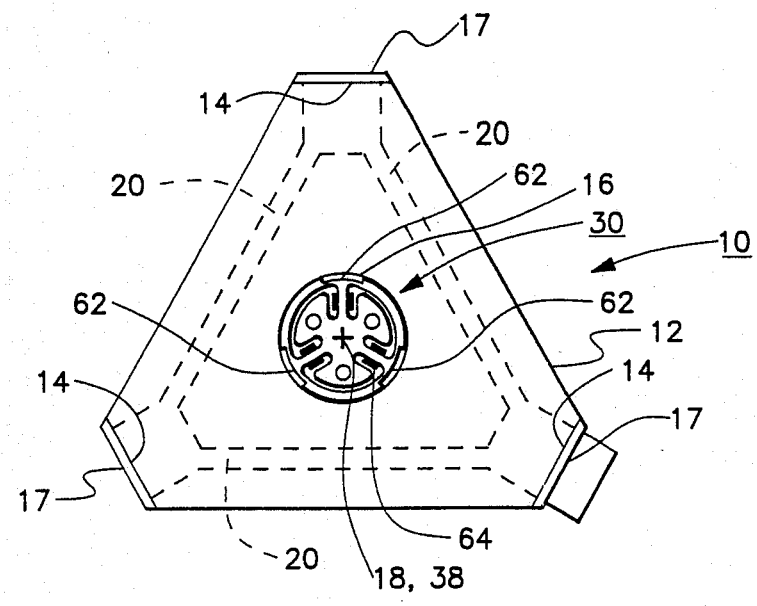
FIG. 1 is a top plane view of the ring laser gyro of the present invention.

In accordance with the principles of the present invention a ring laser gyro, generally indicated by the numeral 10, includes laser block 12 which provides a closed-loop optical path having three or more apexes 14. A cylindrical mounting bore 16 is located centrally in the block 12, and an axis 18 of bore 16 is (which may be, but not required) at the inertial center of gyro 10. A plurality of apertures 20 between each apex 14 surround the bore 16 and provide an optical lasing path. Each apex 14 has an appropriate inward facing mirror 17 which in combination provides an optical closed-loop path for counter-propagating laser beams. Although gyro 10 is illustrated with a triangular closed-loop path, other polygon structures are within the scope of the present invention. The laser gyro structure so far recited is well known in the art.

Figure 2:
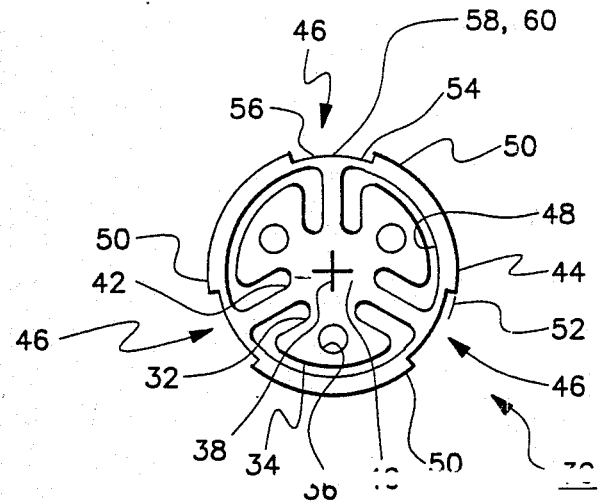
FIG. 2 is a top plane view, in detail, of the dither spring of the present invention and of the gyro of FIG. 1.

An important feature of this invention and in this gyro 10 is the dither spring mounted in the bore 16 and generally indicated by the numeral 30 in both FIGS. 1 and 2. Dither spring 30 enables gyro block 12 to be appropriately oscillated about axis 18 for prevention of lock-in. This oscillation is generally referred to as dither.

Dither spring 30 has a central mounting and securement member 32 with a plurality of ears 34 which each have an elongate fastener aperture 36 for appropriate fasteners such as bolts (not shown) to fasten and secure the dither spring 30 and therefore the gyro 10 to an appropriate gyro support or inertial platform (not shown). The central mounting member is shown to have the same quantity of ears 34 and fastener apertures 36 as the gyro block 12 has apexes 14. However, alternate arrangements are possible and are intended to be within the scope of the present invention. The central mounting member 32 is preferably centered on an axis 38 of the dither spring 30 and has a central pillar 40. A plurality of radial members 42 each adjoin and extend radially outward from pillar 40. Further, dither spring axis 38 passes through an extension of a plane passing through each radial member. These radial members 42 are often referred to as dither reeds.

An important feature of dither spring 30 is a tubular outer ring member 44 around the central mounting member 32 and coaxial about dither spring axis 38. The inner end of each radial member 42 is integrally adjoined to and is extending outward from the central mounting member 32 and more particularly pillar 40. An outer end of each radial member 42 is shown to be integrally adjoined to outer ring member 44 at a generally T-shaped junction 46. The outer ring member 44 has inside arcuate surfaces 48 between each adjacent pair of radial members 42. The inside surfaces 48 of outer ring member 44 and T-junctions 46 jointly define a single constant inner ring diameter which is also coaxial with spring axis 38. These inner surfaces 48 and each of the radial members 42 are spaced from and have sufficient clearance with respect to the central mounting member 32 for unobstructed dither of the tubular outer ring 44 about the spring axis 38 and with respect to central member 32 which is normally fixedly mounted upon and fastened to the unshown gyro platform.

Another important feature of dither spring 30 is a plurality of arcuately spaced apart and arcuately segmented diametric outer mounting surfaces 50, hereafter referred to as outer surface segments 50. The outer surface segments 50 each have a discrete outward facing convex surface of a generally constant radius swung from the spring axis 38.

All of the outer surface segments 50 jointly define a major outer diameter 52 of ring member 44 and spring 30. The major outer diameter 52 is also concentric with spring axis 38. The major outer diameter 52 is precisely sized to fit within the block bore 16 with each outer surface segment 50 being secured to the bore 16, with a minimum of stress being imparted to the block 12. Preferably, spring 30 is secured to block by an adhesive or the like.

Each junction 46 is also an arcuate segment and is disposed between an adjacent pair of outer surface segments 50. Each junction 46 has a junction wing 54 and 56 extending transversely to each side of the respective radial member 42. Each junction 46 has an outer surface 58 which is spaced radially inward toward the spring axis 38 from the major outer diameter 52; and there is a radial space on the outside of each junction 46. This radial space will subsequently become a void 62 in the gyro 10 as will be described.

In the illustrations, each outer surface 50 is shown having a greater angular width than an adjacent junction 46. However, the angular width of outer surface 50 need only be as large as required to provide a sufficient mounting surface to secure spring 30 to block 12 and provide good mechanical stability. Good results have been obtained in which each junction 46 has an angular width of about forty-five degrees, and each outer surface segment 50 has an angular width of about seventy-five degrees. These just mentioned angular widths being only exemplary.

In the exemplary structure of dither spring 30 illustrated in FIGS. 1 and 2, the outer tubular ring 44 is circumferentially closed at the intersection of each junction 46 with each adjacent outer surface segment 50. The wall section thickness of the outer ring member 44 is the thickest at the outer surface segments 50, and the thinnest at the junctions 46. The outer surface segments 50 are the thickest and give great solidity where fastened to the block bore 16. The arcuate width of each junction 46 including rings 54 and 56 may be split symmetrically, as illustrated, to each side of each radial member 42. The length of each junction wing, 54 and 56, is generally greater than the thickness of the junction wing. These structural details, again, being only exemplary for ease of understanding and construction, particularly for a 3-legged gyro. Other structures may be advantageous for laser block bodies of different structures.

Each junction 46 is spaced radially inward of the outer surface segments 50. Each outer surface segment 50 is arcuately spaced from the nearest radial member 42 by a respective junction wing 54 and 56. The junction outer surfaces 58 are illustrated outwardly convex and diametric on a radius swung from the spring axis 38. Outer surfaces 58 jointly define a minor outer diameter 60 which is smaller than and concentric on the inside of both the major outer diameter 52 and the block bore 16. These details also being exemplary.

Although not shown, dither spring 30 is generally of a constant cross-section along its axial length within opposed axial ends of the outer ring member 44. Outer surface segments 50 are secured along their circumferential length to the block bore 16 with a void 62 being created between each junction 46 and block bore 16. Specifically, each junction 46 is spaced radially inward from and is not in contact with block bore 16, i.e. non-contact. Piezo-ceramic crystals 64 are mounted upon radial members 42 for effecting dither motion in gyro 10 in the well known manner.

As indicated earlier, the intention of the novel dither spring of the present invention is to provide thermal neutrality by minimizing mechanical stress on the laser block when both the laser block and dither spring are subjected to changes in temperature. In most ring laser gyros, the laser block is generally stable. However, dither springs will generally experience thermally induced dimensional changes. Thermally induced dimensional changes of prior art dither springs will generally impart a stress on the block. This stress on the block is generally caused by the dimensional changes of the dither spring. Particularly, dimensional changes of the radial members is transferred through the radial members to the outer surface segments which are secured to the block, thereby imparting a thermally induces stress on the block.

The structure of dither spring 30 in accordance with the present invention minimizes the stress imparted unto the laser block as will be subsequently described. In the present invention, thermally induced dimensional changes of the radial members or other members of the dither spring are taken up by resilient spring action of the junction 46 between the outer surface segments. This is specifically accomplished by making junction 46, including wings 54 and 56, particularly thin to provide resiliency to thermally induce dimensional changes of the radial members. During relative thermal expansion or contraction of radial members 42, junctions 46 will displace into and out of the voids 62 between the junction 46 and bore 16, and will not touch or abut against the block bore 16. Therefore, radial members 42 will not be in direct compressive engagement with gyro block 12 and block 12 will not be stressed by such a condition. During relative thermal contraction of radial members 42, junction 46 will pull inwardly and away from the block bore 16 and block 12 will not experience direct tensile loading from radial members 42. The void 62 will become larger during relative contraction of radial members 42. Junctions 46 also neutralize any torsional loadings upon bore 16 from bending flexure of radial member 42.

Output deviations of ring laser gyros (generally attributed to cavity length changes, mode resets, and the like) are reduced with the structure and method of this invention. The accuracy of the gyro outputs in accordance with the present invention, can be demonstrably and significantly increased with these inventions, and greatly improved thermal neutrality can be obtained.

Those skilled in the art will recognize that only preferred embodiments of the present invention have been discloses herein, other advantages may be found and realized, and various modifications may be suggested by those versed in the art, and it should be understood that the embodiment shown herein may be altered and modified without departing from the true spirit and scope of the invention as defined in the accompanying claims.

Specifically, the geometric structure illustrated in the drawing is only exemplary of one embodiment of the invention. The various contours, spacings, and thickness of the junctions 46, wings 54 and 56, outer surface segments 50, radial members 42, and central mounting member 34 as described may be changed without departing from the true spirit and scope of the present invention. For example, many more radial members may be utilized to provide the spring action. The thickness and length ratios between the arcuate segments of the combination unction and wings, and the outer surface segments may be more or less than one. The only requirement is the ability of the radial member to move freely to impart rotation to the laser block and at the same time not impart stress to the laser block resulting from thermally induced dimensional changes of the dither spring.

Lastly, the embodiment of the invention described herein shows and a unitary structure which has a completely closed outer tubular ring. It is within the scope of the present invention and the accompanying claims for a dither spring structure which is comprised of a plurality of members secured to each other. Further, the outer tubular ring need not be closed.

The embodiments of an invention in which an exclusive property or right is claimed are defined as follows:
1. A laser gyro comprising:
    a ring laser structure including a block having a mounting bore about a bore axis, and apertures and mirrors which define a ring laser path;
    a dither spring mounted to said block coaxially within said bore such that said bore axis is in parallel with a central axis of said dither spring, said dither spring having,
    a central member for mounting of the dither spring to a gyro platform,
    a tubular outer ring member, said outer ring member having outer surface segments secured to said block within said bore,
    a plurality of radial members generally extending radialy from said central axis, each of said radial members having first and second end portions, each of said first end portions adjoining said central member, and each of said second end portions adjoining said tubular outer ring at a generally T-shaped juncture, and
    wherein said tubular outer ring secured to said block bore at surfaces thereof on both sides of said T-shaped juncture, and said tubular outer ring at each of said T-shaped junctures being spaced inward and toward said bore axis, and in non-contact with said block thereby producing thermal stress relief.

2. The gyro of claim 1, in which the dither spring outer ring member is circumferentially closed at each intersection of said junctions and outer surface segments.

3. The gyro of claim 1, in which the dither spring outer ring member has a circumferentially closed inner diameter which is spaced outward from said central member.

4. The gyro of claim 1, in which the dither spring outer ring member has an inner closed diametric surface of a constant diameter.

5. The gyro of claim 4 wherein the thickness of said dither spring ring member is greater at the outer surface segments than at the junctions.

6. The gyro of claim 1, in which said dither spring outer ring member defines a major outer diameter spaced radially from the outer surface of each unction.

7. The gyro of claim 6 in which said dither spring outer surface segments are concentric with said bore axis.

8. The gyro of claim 6, in which each of said dither spring outer surface segments are spaced from each adjacent radial member a distance which is greater than a thickness of the outer ring member as measured between the radial member and the major outer diameter.

9. The gyro of claim 6, in which said dither spring junctions have outer surfaces defining a minor outer diameter which is coaxial with the major outer diameter and the block bore.

10. The gyro of claim 1 in which the thickness of said dither spring T-shaped junctions is sufficiently resilient for absorbing thermally induced dimensional changes of said radial members and preventing stress to be imparted to said block by said dimensional changes being transferred to said block through said outer surface segments.

11. The gyro of claim 1, in which said dither spring outer surface segments have a cumulative circumferential length which is sufficient to secure said spring to said block.

12. The gyro of claim 1, in which each of said dither spring outer surface segments are spaced radially from an immediately adjacent radial member.

13. The gyro of claim 12, in which the spacing between adjacent ones of said dither spring outer surface segments is radially symmetrical about the raidal member.

14. In a ring laser gyro with improved thermal neutrality and having a block with a centrally located mounting bore of a selected diameter and apertures and mirrors which define a laser path, a dither spring within the bore and having a central support structure for common support of the dither spring and the block by a gyro platform, and a plurality of radial members attached to and extending outward from the support structure, the improvement comprising:
    a tubular outer ring member having segments with each having an outer surface affixed to said block within said mouting bore,
    said tubular outer ring member including a junction between each pair adjacent ones of said outer surface segments for adjoining said adjacent outer surface segments and only one of said radial members, said junctions each having an outer surface between adjacent one of said segments, and each junction outer surface being spaced inward from said bore and in non-contact with said block thereby producing thermal stress relief.

15. In the gyro of claim 14, said dither spring junction outer surfaces define a minor outer diameter which is concentric to and smaller than the diameter of the mounting bore.

16. In the gyro of claim 14, a junction wing extending to each side of a respective radial member, each junction wing being longer than it is thick.

17. In the gyro of claim 14, a void between each junction and the block bore.

18. In the gyro of claim 17, a junction wing on each side of each radial member, said junctions each having a convexly curved outer surface.

19. The gyro of claim 14 in which said junctions are sufficiently resilient for absorbing thermally induced dimensional changes of said radial members and preventing stress to be imparted to said block by said dimensional changes being transferred to said block through said outer surface segments.

20. A dither spring for a laser gyro block comprising:
a circumscribing tubular outer ring member, said outer ring member having a segmented and diametric mounting surface forming a major outer diameter about a central axis;
dither spring support means extending generally coaxially within said tubular ring;
a plurality of radial members adjoined to and extending from the dither spring support means to the outer ring member, each radial member being adjoined to the outer ring member at a generally T-shaped junction; and in which
an outer surface of each junction is spaced inward toward the central axis from the major outer diameter; and a junction wing extending to each side of a respective radial member, and in which the thickness of said junction wings are sufficiently resilient for absorbing thermally induced dimensional changes of said radial members and preventing stress to be imparted to said block by dimensional changes being transferred to said block through said outer surface segments.

21. The gyro dither spring of claim 20 having a constant cross-section along its axial length.

22. The gyro either spring of claim 20 in which the tubular ring member has a complete circumferential inner surface between adjacent ones of said radial members.

23. The gyro dither spring of claim 22, in which the tubular ring member has a complete circumferential inner surface to which outer ends of the radial members are adjoined, said inner surface being concentric to a minor outer diameter defined by said junction outer surfaces.

24. The gyro dither spring of claim 22 in which said inner surface is of a constant diameter within both the junctions and the segmented mounting surfaces.

25. The gyro dither spring of claim 20 in which each junction has a wing extending transversely from a respective radial member, each wing being longer than it is thick.

26. The gyro dither spring of claim 25 in which said junction wings are of a generally constant thickness, such thickness being less than the thickness of the outer ring member at the diametric mounting surface.

27. A method of suspending the laser block of a ring laser gyro and obtaining improved thermal neutrality during dither, comprising the steps of:
providing a cylindrical bore in the laser block;
providing a dither spring having a tubular outer ring member with surface portions extending to a major outer diameter and a plurality of junctions attached to internal radial members, each junction being spaced inwardly from the major outer diameter;
fastening the outer ring member surfaces to the block bore; and
leaving a void between each junction and the block bore; and expanding or contracting the junctions in their respective void in response to a change in temperature of the gyro.

* * * * *

UNITED STATES PATENT AND TRADEMARK OFFICE
CERTIFICATE OF CORRECTION

PATENT NO. : 4,847,855
DATED : July 11, 1989
INVENTOR(S) : Robert W. Derry and Richard L. Langton It is certified that error appears in the above-identified patent and that said Letters Patent is hereby corrected as shown below:

Colume 6, line 19, delete "unction" and substitute with --junction--.

Signed and Sealed this

Fifteenth Day of May, 1990

Attest:

HARRY F. MANBECK, JR.

*Attesting Officer*  *Commissioner of Patents and Trademarks*